United States Patent Office 3,014,265
Patented Dec. 26, 1961

3,014,265
SATURATION OF CAPACITOR IMPREGNANT
Sidney D. Ross, Williamstown, Mass., assignor to Sprague Electric Company, North Adams, Mass., a corporation of Massachusetts
No Drawing. Filed Nov. 12, 1959, Ser. No. 852,205
2 Claims. (Cl. 29—25.41)

This invention relates to impregnants for electrical capacitors and more particularly to an impregnant which is adapted to capacitor operation and to the method for providing the impregnant.

Electrostatic capacitors of rolled elements are made up by convolutely winding interleaved electrodes and dielectric material. This construction is improved by the impregnation of a suitable dielectric generally referred to as an oil dielectric. The section of impregnated convolutely wound elements is contained within a sealed enclosure such as a capacitor container to produce a capacitive device having good electrical characteristics. The impregnant in the capacitor section within the can is subject to a variation of volume influenced by an air space also within the container which is variable in volume depending upon the ambient conditions. The air space within the container is necessary to accommodate expansion of the impregnant. The conditions within the container may be considered the product of a balance between the impregnant and the air space. As the temperature increases the impregnant expands and the air space accommodates this expansion. On the other hand, at a decrease of temperature the impregnant contracts with a corresponding expansion of the air space. The accommodation of the impregnant expansion reduces the problem of container ruptures from excessive internal pressures created at elevated temperatures which can even result in explosion.

When the temperature is substantially lowered, the change in the air space volume is accompanied by a reduction of the pressure within the container. This reduction in pressure in turn minimizes the insulation resistance within the contained capacitor section. The nitrogen of the air becomes absorbed into the impregnant and this absorption tends to aggravate the pressure loss and the resultant lowering of insulation resistance.

The reduction of air pressure resulting from the loss of nitrogen into the impregnant has been the subject of various attempts at correction. There has been some amelioration by the use of container sealing techniques. In closing the container, however, it is desirable to close the container at temperatures other than room temperature. The pressure variation is exaggerated and capacitors are subjected to the great variation in temperatures from above the temperature of section impregnating down to as low as −50° C.

The air space in the capacitor is required to provide room for the expanded impregnant for two reasons. The capacitor being filled with an impregnated section at a deviation from room temperature is invariably subject to the contraction of the impregnant in cooling to room temperature. The container volume must provide room for impregnant upon temperature increase expansion. The cushion is needed both in expansion from low temperature to room temperature and from room temperature to high temperature. On the other hand, the air space over the impregnant within the can causes troubles in lowering the insulation resistance as explained above. For various reasons it is desirable to avoid this condition by simply adding some further material to the impregnant.

It is an object of this invention to provide an oil impregnated capacitor contained in a can which avoids excessively reduced pressures within the can at low temperatures.

It is a further object of this invention to provide an impregnated capacitor with an impregnant which is not susceptible to absorption of nitrogen from an air expansion space within the capacitor can.

It is still another object of this invention to provide an oil impregnated capacitor having a capacitor-containing can enclosing an air cushion which will have a limited reduced pressure area within the capacitor-containing can upon temperature change.

In this invention the impregnant is adapted to avoid absorption of nitrogen from the air cushion in the capacitor container. This repulsion to absorption of the nitrogen from the air by the dissolution of the nitrogen into the impregnant prevents the nitrogen of the air from dissolving into the impregnant. The most effective way to equip the impregnant with opposition to absorption is by acting upon the impregnant after the sealing of the can containing the impregnant.

In general, a method introduces nitrogen into the impregnant of a high voltage, high stress capacitor to saturate the impregnant with nitrogen. The impregnant is provided with a substance which decomposes in the impregnant at a point above the temperature of its addition to the impregnant and at not more than the temperature to which the sealed device is heated in use. An azo compound is used to provide the necessary nitrogen. The azo compound must provide nitrogen upon decomposition, and no undesirable by-products can be tolerated. For example, a hydrocarbon which does not affect the insulation resistance is a suitable by-product.

The decomposable substance is dissolved in an impregnant for impregnation into a high-voltage high-stress device. This material is added to the device just before the unit is sealed with the impregnated section and the impregnant in the can. The material is added in the requisite amount to provide saturation of the impregnant with the nitrogen after sealing. The saturation takes place when nitrogen is produced by decomposition. The nitrogen dissolves into the impregnant up to the point of saturation of the nitrogen in the impregnant.

Suitable azo compounds are those which cleanly decompose into nitrogen and an innocuous hydrocarbon; the decomposition taking place in a temperature range of between 50° C. and about 125° C., while not taking place appreciably at temperatures below 50° C. The decomposable compound is soluble in the impregnant. The innocuous hydrocarbon formed is one which does not affect the insulation resistance of the impregnant. As an example of compounds suitable to provide the substance for nitrogen saturation of the impregnants certain azo-alkanes in dielectric oil impregnants have been found suitable to prevent low temperature breakdown.

In particular, azo-bis-arylalkanes are effective in the saturation of impregnants after sealing of a capacitor by the production of nitrogen for saturation through quantitative decomposition at temperatures of the critical range.

These compounds are generally represented by the following structural formula

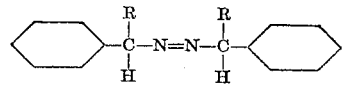

wherein R represents a member of the group of hydrogen, methyl, ethyl, iso-butyl or n-hexyl radicals. In general, R substituent is an alkyl radical having up to six carbon atoms. One such compound is suitably prepared by condensing hydrazine and acetophenone to form acetophenoneazine, which is then reduced to the hydrozine, and finally oxidized to 1-azo-bis-1-phenylethane having the following structural formula:

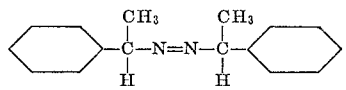

This compound decomposes quantitatively into nitrogen and 2,3-diphenylbutane as follows:

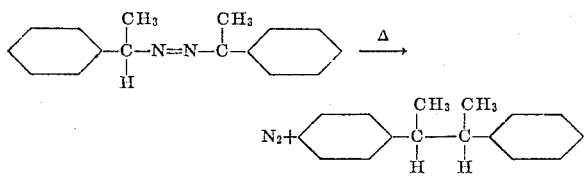

The rate of decomposition of the 1-azo-bis-1-phenylethane in ethyl benzene and at temperatures of decomposition are satisfactory to provide the nitrogen for saturation from useful quantities of the material. To illustrate the rate of decomposition of 1-azo-bis-1-phenylethane the rate of decomposition has been determined in ethyl benzene. The following table sets forth the life of the 1-azo-bis-1-phenylethane in ethyl benzene in half-life hours at temperatures within the critical range.

TABLE I

| °C. temperature: | Hours, half-life |
|---|---|
| 100.4 | 2.53 |
| 110.3 | 1.14 |

The rate of decomposition of 1-azo-bis-1-phenylethane in dielectric oils is illustrated by the rates tabulated in Table I in ethyl benzene. The decomposition reaction is not appreciably subject to variations in the solvent, and the rates of the decomposition in ethyl benzene and in dielectric oils are analogous. Thus, it is seen that the 1-azo-bis-1-arylalkanes provide a material soluble in impregnants which will produce free nitrogen for saturation of the impregnant by decomposition at temperatures within the critical range. The following example sets forth the incorporation of such a compound in a typical unit and is presented for the purpose of illustration and is not limitative of this invention.

*Example I*

A convolutely wound capacitor having 100 ml. of a linear copolymer of a mixture of isobutylene and diolefin impregnant was positioned in a container. Immediately preceding the sealing of the unit a charge of 0.0638 gram of 1-azo-bis-1-phenylethane was deposited in the container in the form of a pellet. Subsequent to sealing the 1-azo-bis-1-phenylethane was completely decomposed at a temperature of 110° C. and produced approximately 6.0 cc. of nitrogen gas within the sealed capacitor. The nitrogen gas was dissolved in the impregnant.

Thus, by the addition of a minor amount of this azo-alkane compound into a liquid dielectric impregnant in a capacitor, nitrogen is released within the sealed capacitor to achieve nitrogen saturation of the impregnant.

The electrical characteristics of a high voltage, high stress capacitor are preserved against deterioration by the solution from air within the capacitor into the impregnant. As a result, the expansion space of air can be used within such a capacitor with a minimization of the reduced pressure condition at below average temperatures.

Having described this invention in certain of its preferred embodiments, and having given an example illustrating the use and effectiveness of the same, it is not intended that the invention be limited other than by the scope of the appended claims.

What is claimed is:
1. In a capacitor impregnant in a capacitor dielectric contained in a housing, a compound in said impregnant decomposable to form nitrogen and a hydrocarbon preserving the electrical properties of the impregnant to saturate said impregnant with said nitrogen, said compound having the following formula

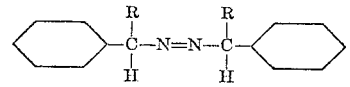

in which R is selected from the group consisting of hydrogen and lower alkyls of 1–6 carbon atoms.

2. A method of impregnating a capacitor including the steps of impregnating a porous spacer of a convolutely wound dielectric layer in a capacitor section, positioning said section in a sealable can, introducing a compound of the formula

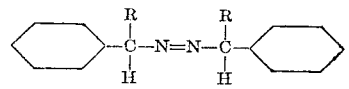

in which R is selected from the group consisting of hydrogen and lower alkyls of 1–6 carbon atoms, sealing said section in said can and subsequently decomposing said azo-alkane to form nitrogen and a hydrocarbon preserving the electrical properties of the impregnant and saturating said impregnant with said nitrogen.

References Cited in the file of this patent

UNITED STATES PATENTS 2,520,339    Robertson    Aug. 29, 1950